Dec. 25, 1945.   H. E. HODGSON ET AL   2,391,418
DRIVE FOR VALVES AND THE LIKE
Original Filed April 10, 1939   3 Sheets-Sheet 1

Inventors
Howard E. Hodgson
Clarence W. Kuhn
By Frank H. Hubbard
Attorney

Dec. 25, 1945. H. E. HODGSON ET AL 2,391,418
DRIVE FOR VALVES AND THE LIKE
Original Filed April 10, 1939 3 Sheets-Sheet 2
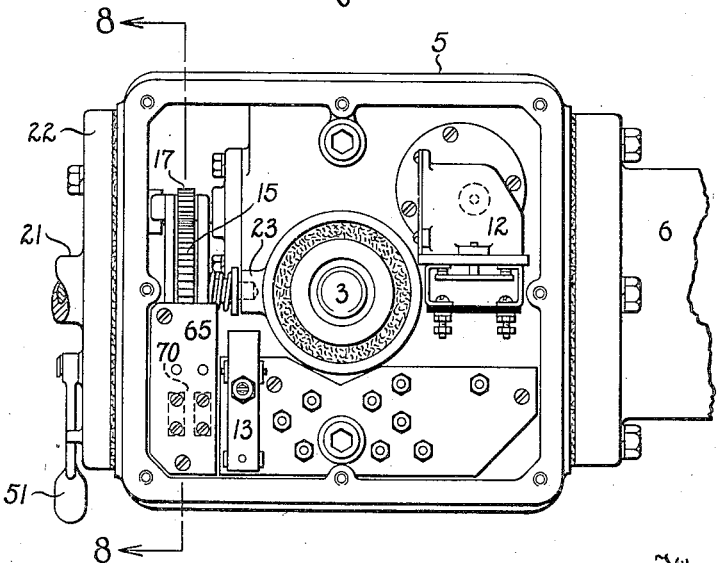
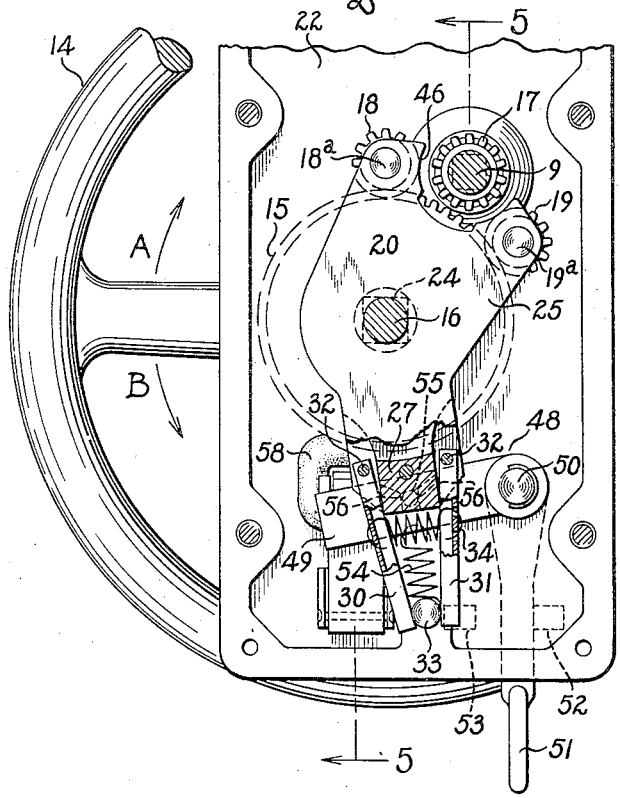
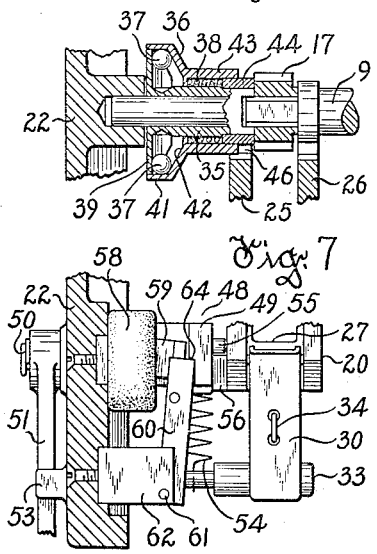
Inventors
Howard E. Hodgson
Clarence W. Kuhn
By Frank H. Hubbard
Attorney Dec. 25, 1945.  H. E. HODGSON ET AL  2,391,418
DRIVE FOR VALVES AND THE LIKE
Original Filed April 10, 1939  3 Sheets-Sheet 3
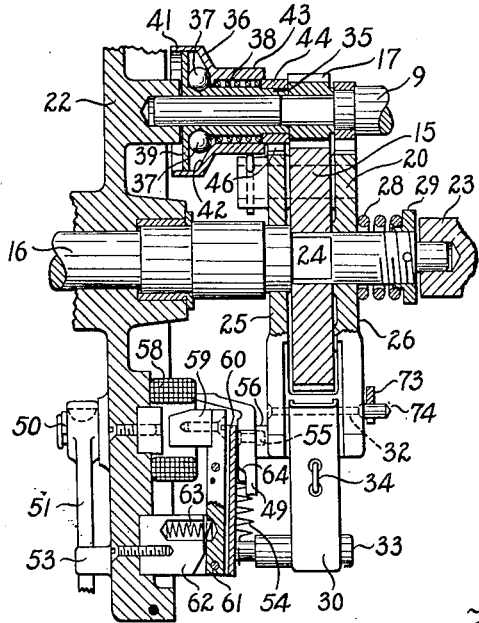
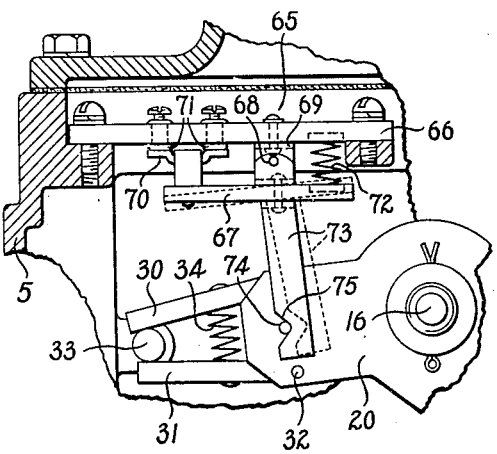
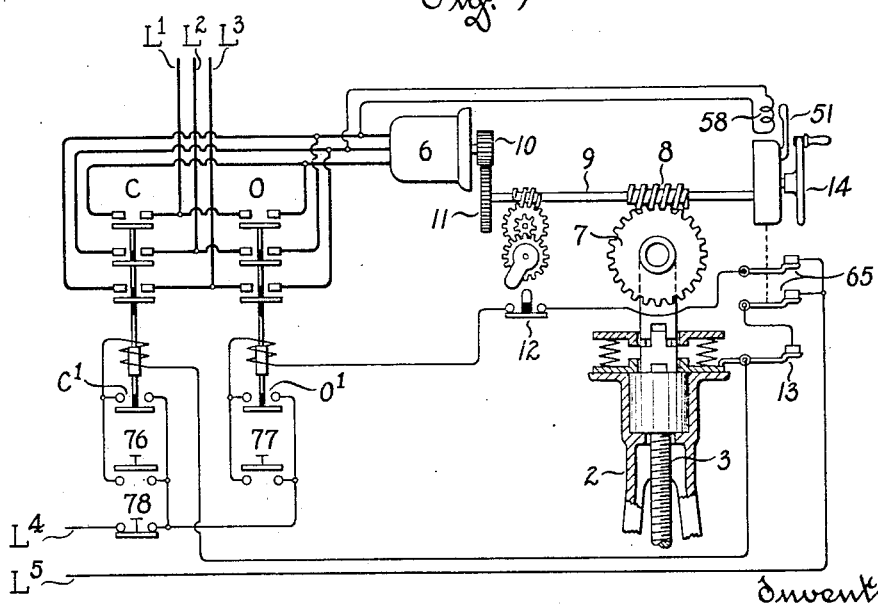
Inventors
Howard E. Hodgson
Clarence W. Kuhn
By Frank H. Hubbard
Attorney Patented Dec. 25, 1945

2,391,418

UNITED STATES PATENT OFFICE 2,391,418

DRIVE FOR VALVES AND THE LIKE

Howard E. Hodgson and Clarence W. Kuhn, Wauwatosa, Wis., assignors to Cutler-Hammer, Inc., Milwaukee, Wis., a corporation of Delaware Original application April 10, 1939, Serial No. 267,142. Divided and this application March 30, 1942, Serial No. 436,862

15 Claims. (Cl. 74—407)

This invention relates to power operated valve control devices, and more particularly to manual operating mechanisms for use in connection with such devices.

An object of the present invention, generally stated, is to provide a valve drive with improved means affording drive optionally by power or manual force.

Another object is to provide a valve drive having means for minimizing danger of interference between the power and manual forces and for minimizing risks from carelessness on the part of the attendant in shifting from power drive to manual drive, or vice versa.

Another object is to provide an improved manual operating mechanism for valve controls in which manual rotation of an operating element such as a hand wheel automatically causes connection thereof to the valve actuating mechanism.

Another object is to provide a manual operating mechanism of the aforesaid character having means for insuring against connection of the manual operating element to the valve actuating mechanism except upon substantial arrest of the latter.

Various other objects and advantages of the invention will hereinafter appear.

The application is a division of the copending Hodgson et al. application Serial No. 267,142, filed April 10, 1939, and has particular relation to the manual operating mechanism disclosed therein.

The accompanying drawings illustrate an embodiment of the invention which will now be described, it being understood that the embodiment illustrated is susceptible of modification without departing from the spirit and scope of the appended claims.

In the drawings,

Figure 1 is a side elevational view of a valve operating unit embodying the invention, a portion of the enclosing casing being broken away and shown in section;

Figs. 2 and 3 are sectional views taken on lines 2—2 and 3—3, respectively, of Fig. 1;

Fig. 4 is a fragmentary sectional view on line 4—4 of Fig. 2;

Figs. 5 and 6 are fragmentary sectional views on line 5—5 of Fig. 4;

Fig. 7 is a side elevational view of certain of the parts shown in Fig. 5;

Fig. 8 is a fragmentary sectional view on line 8—8 of Fig. 3, and

Fig. 9 is a diagrammatic view illustrating the circuit connections for the valve operating unit shown in Fig. 1.

Figure 1:
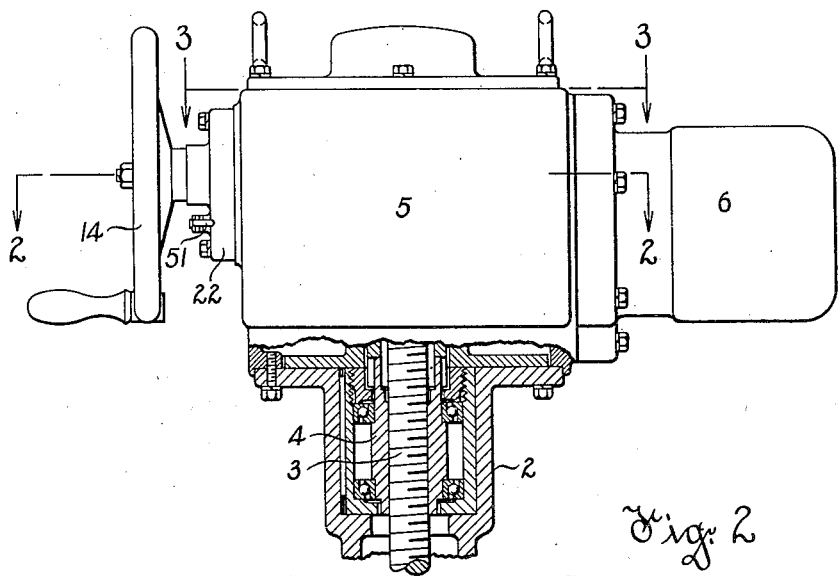
Figure 2:
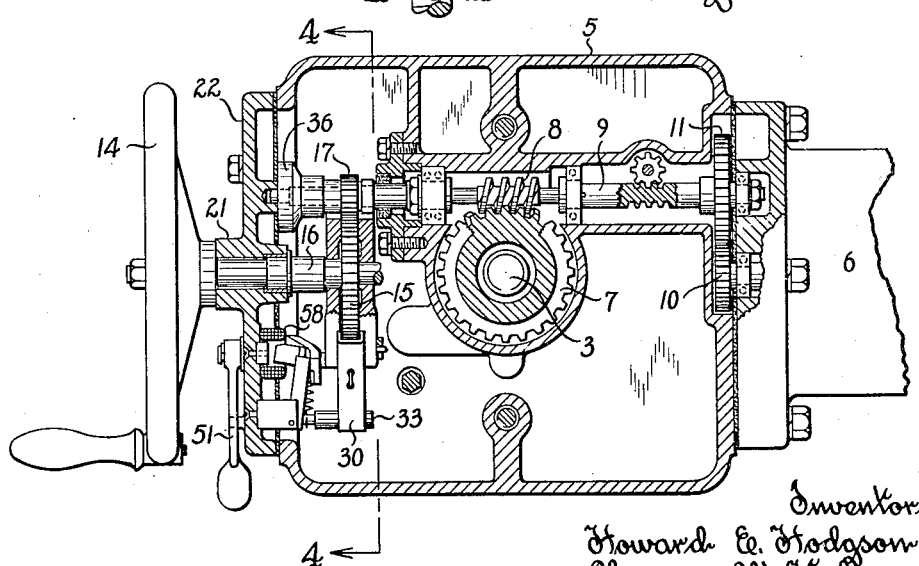

Referring to Fig. 1, the same illustrates a valve operating unit for top mounting upon the yoke 2 of a conventional valve having a non-rotatable spindle 3 and an associated rotatable operating nut 4. The operating unit is provided with an enclosing casing 5 which carries a driving motor 6 and contains a gear drive (Fig. 2) including a worm wheel 7 and an associated worm 8. Worm wheel 7 is operatively connected to nut 4 to rotate the same and also permit upward axial movement thereof out of the position shown in Fig. 1, and worm 8 is formed upon a shaft 9 which is operatively connected to motor 6 through the medium of spur gears 10 and 11. Casing 5 contains a limit switch 12 (Fig. 3) which is driven from shaft 9 and provides for automatic stopping of motor 6 when the valve is moved into open position. Casing 5 also contains a limit switch 13 (Fig. 3) for effecting stopping of motor 6 when the valve is moved into closed position, said limit switch being operated by a thrust responsive mechanism (not shown) which is associated with the valve operating nut 4.

In accordance with the present invention the worm shaft 9 of the above described valve operating unit has a manual operating mechanism associated therewith including a hand wheel 14 which is normally disconnected from said shaft and is adapted to be automatically coupled thereto when rotated in either direction. As hereinafter set forth the manual operating mechanism is provided with means for preventing coupling of hand wheel 14 to shaft 9 except upon substantial arrest of the latter and also has control means associated therewith which insures against energization of the driving motor 6 of the valve unit during manual operation. Also as hereinafter set forth the manual operating mechanism has a locking device associated therewith which acts to insure disconnection of hand wheel 14 from the worm shaft 9 upon energization of motor 6.

As shown in Figs. 4 and 5 the manual operating mechanism includes a spur gear drive comprising a driving gear 15 fixed to an operating shaft 16, a driven gear 17 fixed to the worm shaft 9, and a pair of pinions 18 and 19 which mesh with the driving gear 15 and are arranged on opposite sides of the driven gear 17. The pinions 18 and 19 are carried by a yoke 20, and as hereinafter set forth said yoke is normally held in the position shown in Fig. 8 to prevent meshing of either of said pinions with driven gear 17.

More specifically, hand wheel 14 is fixed to the outer end of shaft 16, and said shaft is journaled within a bearing projection 21 on a cover plate 22 secured to casing 5. Shaft 16 is held against axial movement within bearing projection 21 and the inner end thereof is supported within an opening in a lug 23 (Fig. 3) formed on the interior of casing 5. Driving gear 15 is fixed to a square section 24 on shaft 16 and yoke 20 is rotatably mounted upon said shaft and is provided with spaced side arms 25 and 26 which are located on opposite sides of said gear. Yoke 20 has a connecting portion 27 on one end thereof which extends between the side arms 25 and 26 and the pinions 18 and 19 are associated with the opposite end of said yoke, the same being rotatably mounted upon pins 18a and 19a respectively held within openings in said arms.

As shown in Fig. 5, arm 26 of yoke 20 is held in frictional engagement with driving gear 15 by a helical spring 28 which is held under compression between said arm and a collar 29 fixed to shaft 16. Yoke 20 is thus adapted to rotate with gear 15 and upon rotation of hand wheel 14 in the direction of arrow A, Fig. 4, pinion 18 is moved into mesh with gear 17 and upon continued rotation of said hand wheel in the direction of arrow A gear 15 slips with respect to yoke 20 and acts through the medium of said pinion to drive gear 17 and worm shaft 9 in a clockwise direction. Upon rotation of hand wheel 14 in the direction of arrow B, Fig. 4, pinion 19 is moved into mesh with gear 17 and upon continued rotation of said hand wheel in the direction of arrow B gear 15 slips with respect to yoke 20 and acts through the medium of said pinion to drive gear 17 and worm shaft 9 in a counterclockwise direction.

Yoke 20 has a spring mechanism associated therewith for normally holding the same in the position shown in Fig. 4 to prevent meshing of either of the pinions 18 or 19 with the driven gear 17. Such mechanism comprises a pair of fingers 30 and 31 which extend outwardly from yoke 20 and are located on opposite sides of the connecting portion 27 of said yoke. The inner ends of fingers 30 and 31 are pivotally secured to yoke 20 by pins 32 and the outer ends of said fingers are located on opposite sides of a pin 33 fixed to the cover plate 22. Fingers 30 and 31 are biased toward each other by a helical spring 34, and as is apparent said fingers cooperate with pin 33 and connecting portion 27 on yoke 20 to bias said yoke against movement in opposite directions out of the position shown in Fig. 4. Upon rotation of hand wheel 14 in either direction yoke 20 is moved out of normal position by frictional engagement with gear 15 against the biasing action of fingers 30 and 31, and upon release of said hand wheel said fingers act to return said yoke and the parts connected thereto to the normal position shown in Fig. 4 for disengagement of hand wheel 14 from worm shaft 9.

As hereinbefore stated, the manual operating mechanism is provided with means for preventing coupling of hand wheel 14 to the worm shaft 9 except upon substantial arrest of the latter. As shown in Figs. 5 and 6, such means comprises an inner cone element 35 fixed to worm shaft 9, an outer cone element 36 slidably mounted upon said former cone element for movement into and out of locking engagement with yoke 20, and a plurality of balls 37 which are adapted to act by centrifugal force to move said outer cone element into locking engagement with said yoke against the action of a helical spring 38. Inner cone element 35 is held against axial movement between gear 17 and cover 22 and the left end thereof is provided with a flange projection 39 having a cone surface which is radially recessed as shown in Fig. 6 to receive the balls 37. The outer cone element 36 is provided with a cup-shaped portion 41 which surrounds the flange projection 39 on the inner cone element 35 and has a cone surface 42 on the interior thereof corresponding to the cone surface on said inner cone element. Outer cone element 36 is also provided with a sleeve projection 43 which is bored to receive a collar 44 fixed to the right end of cone element 35. Spring 38 is located within the sleeve projection 43 and is held under compression between collar 44 and a shoulder formed on the inner surface of said sleeve projection. As shown in Fig. 4, the side arm 25 of yoke 20 is provided with a substantially semi-circular recess 46 which is arranged midway between the pinions 18 and 19 and is adapted to receive the sleeve projection 43 on outer cone element 36.

As shown in Fig. 5, outer cone element 36 is normally held out of engagement with side arm 25 of yoke 20 under the action of spring 38. However, when worm shaft 9 is driven by motor 6 the balls 37 are moved outwardly by centrifugal force from the position shown in Fig. 5 into the position shown in Fig. 6. Upon outward movement of the balls 37 into the position shown in Fig. 6 the same engage cone surface 42 on outer cone element 36 to move said element from the position shown in Fig. 5 into the position shown in Fig. 6. Sleeve projection 43 is thus projected into the recess 46 in arm 25 and yoke 20 is then locked against movement out of the position shown in Fig. 4 to prevent coupling of the hand wheel 14 to worm shaft 9. The outer cone element 36 remains in locking position until worm shaft 9 is brought substantially to rest, whereupon said cone element is returned by spring 38 to the normal position shown in Fig. 5. Upon return of outer cone element 36 to normal position, yoke 20 is released to permit coupling of hand wheel 14 to worm shaft 9.

Yoke 20 also has a locking mechanism 48 associated therewith which normally locks said yoke in the position shown in Fig. 4 to prevent coupling of hand wheel 14 to worm shaft 9. Such locking mechanism comprises a lever 49 fixed to a shaft 50 which is rotatably mounted within an opening in cover 22. The outer end of shaft 50 has a manual operating lever 51 fixed thereto which is movable between stop projections 52 and 53 on cover 22. Lever 49 and its associated operating lever 51 are normally held in the position shown in Fig. 4 by a spring 54 having one end connected to said lever and its opposite end connected to pin 33. Lever 49 has a pin 55 fixed thereto which cooperates with a pair of stop projections 56—56 on arm 25 of yoke 20. Pin 55 and lugs 56—56 are shown in dotted lines in Fig. 4, and as shown in this figure said pin is normally located between said lugs to lock yoke 20 in the position shown in Fig. 4 to thereby prevent coupling of hand wheel 14 to worm shaft 9. However, upon movement of operating lever 51 into engagement with stop projection 53 (Fig. 4) pin 55 is moved out of engagement with lugs 56—56 and yoke 20 is then released to permit coupling of hand wheel 14 to worm shaft 9.

Locking mechanism 48 has an electromagnetically controlled latch device associated therewith for holding the same in released position. As shown in Fig. 5 said device comprises a magnet winding 58 mounted upon the inner face of cover 22 and an associated armature 59 having a latch member 60 fixed thereto. Armature 59 and latch member 60 are pivotally mounted upon a pin 61 carried by a post 62 fixed to the inner face of cover 22, and said armature is biased by a spring 63 to yieldingly hold said latch member in engagement with lever 49. Lever 49 is provided with a shoulder 64 and upon movement of said lever into released position said shoulder is engaged by the free end of latch member 60, as shown in Fig. 7, to hold the locking mechanism 48 in released position. As hereinafter set forth, winding 58 is connected in the energizing circuit of motor 6 and upon energization of said motor, armature 59 is attracted by said winding to move latch member 60 out of engagement with shoulder 64. The locking mechanism 48 is thus automatically released to maintain yoke 20 in the position shown in Fig. 4 upon energization of motor 6.

A switch 65, shown in Fig. 8, is associated with the above described manual operating mechanism and as hereinafter set forth said switch acts to prevent energization of motor 6 upon coupling of hand wheel 14 to worm shaft 9. Switch 65 is mounted within casing 5 (Fig. 3) and as shown in Fig. 8 said switch comprises an insulating base 66 having a movable insulating contact lever 67 mounted upon the under side thereof. Contact lever 67 is pivoted intermediate its ends upon a pin 68 carried by a bracket 69 fixed to the under side of base 66, and one end of said contact lever has a pair of bridging contacts 70 mounted thereon which are shown in dotted lines in Fig. 3. As shown in Fig. 8 each of the bridging contacts 70 cooperates with a pair of stationary contacts 71 mounted upon the under side of base 66 and contact lever 67 is biased to hold said bridging contacts in engagement with their associated stationary contacts by a spring 72. Contact lever 67 has an operating arm 73 fixed thereto which extends downwardly and cooperates with a pin 74 fixed to yoke 20. Said operating arm is provided with a notch 75 and upon positioning of yoke 20 in the normal position shown in Fig. 4 pin 74 is located within said notch and the bridging contacts 70 are held in engagement with their associated stationary contacts by spring 72, as shown in Fig. 8. However, upon movement of yoke 20 in either direction out of normal position for coupling of hand wheel 14 to worm shaft 9, pin 74 moves out of engagement with the recess 75 and arm 73 is moved into the dotted line position shown in Fig. 8 to provide for disengagement of bridging contacts 70 with their associated stationary contacts 71.

Referring now to Fig. 9, the same schematically illustrates the aforedescribed valve operating unit and the electric control means therefor. Motor 6 may be of any desired type, the motor shown being of a 3 phase alternating current type to be supplied with current from a circuit indicated by lines $L^1$, $L^2$, $L^3$. The power connections for motor 6 are controlled by a pair of 3 pole electromagnetically operated reversing switches C and O, the former switch being provided with a set of normally open auxiliary contacts $C^1$, and the latter with a set of normally open auxiliary contacts $O^1$. The control means for the reversing switches C and O includes a pair of normally open start push buttons 76 and 77, and a normally closed stop push button 78.

It is assumed that reversing switch C provides for operation of motor M in a direction to close the valve, and that reversing switch O provides for operation of said motor in a direction to open the valve. The position limit switch 12 of the valve operating unit is connected in the energizing circuit of reversing switch O and the thrust responsive limit switch 13 of said unit is connected in the energizing circuit of reversing switch C. The energizing circuits of switches C and O are also controlled by the switch 65 which is associated with the manual operating mechanism of the unit and the magnet winding 58 associated with said mechanism is permanently connected between two of the terminals of the motor 6.

Assuming that the valve is in open position and that it is desired to close the same, push button 76 is depressed to effect closure of reversing switch C for operation of motor 6 in valve closing direction. Upon depression of push button 76 the operating winding of reversing switch C is connected across a supply circuit indicated by lines $L^4$, $L^5$, through the medium of stop push button 78, the thrust responsive switch 13 and the switch 65 associated with the manual operating mechanism. Upon release of push button 76 reversing switch C is maintained energized through the medium of its auxiliary contacts $C^1$. Thrust responsive switch 13 opens when a predetermined seating pressure is applied to the valve and said switch in opening deenergizes reversing switch C to stop operation of motor 6 in its closing direction.

Push button 77 is depressed to effect closure of reversing switch O for operation of motor 6 in valve opening direction. Upon closure of push button 77 the operating winding of reversing switch O is connected across lines $L^4$, $L^5$ through the medium of stop push button 78, the position limit switch 12 and the switch 65 associated with the manual operating mechanism. Upon release of push button 77 reversing switch O is maintained energized through the medium of its auxiliary contacts $O^1$. The position limit switch 12 is set to open upon opening of the valve to a predetermined degree and said limit switch in opening deenergizes reversing switch O to stop operation of motor 6 in valve opening direction. Opening of stop push button 78 interrupts the energizing circuit of both of the reversing switches O and C, and it is thus apparent that the same provides for stopping of motor 6 at any point during valve opening or valve closing operations.

As hereinbefore set forth, hand wheel 14 is normally disconnected from worm shaft 9 and is adapted to be automatically coupled thereto when rotated in either direction, but only upon substantial arrest of said worm shaft and upon release of an associated locking mechanism 48 by a manual operating lever 51. Immediately upon coupling of hand wheel 14 to worm shaft 9 the contacts of switch 65 are opened to prevent establishment of the energizing circuits for reversing switches O and C. Upon disconnection of hand wheel 14 from worm shaft 9 switch 65 is reclosed as hereinbefore set forth to permit motor operation of the valve. As hereinbefore set forth, the locking mechanism 48 has an operating winding 58 associated therewith for maintaining the same in released position, and as shown in Fig. 9 said operating winding is connected across two terminals of motor 6 whereby the same is energized immediately upon establishment of power connections for said motor.

Yoke 20 is capable of limited movement in opposite directions with respect to sleeve projection 43 on cone element 36 when the latter is in locking position, such movement being sufficient to effect opening of switch 65, but insufficient to effect meshing of pinions 18 or 19 with gear 17. Switch 65 is thus operable by hand wheel 14 for effecting stopping of motor 6 at any point during valve opening or valve closing operation. However, if desired the diameter of sleeve projection 43 on cone element 36 may be increased to prevent movement of yoke 20 out of normal position when said cone element is in locking position. Switch 65 is thus rendered ineffective to stop motor operation of the unit since the same can only be opened by hand wheel 14 when worm shaft 9 is substantially at rest.

If desired the magnet 58 and latch 60 associated with locking mechanism 48 may be omitted. Said locking mechanism is then manually held in released position to permit movement of yoke 20 out of the normal position shown in Fig. 4 and upon coupling of hand wheel 14 to worm shaft 9 one of the stop projections 56 on said yoke is located in the path of pin 55 to maintain said locking mechanism in released position pending return of said yoke to normal position. The yoke 20 returns to normal position under the force of spring 34 when the hand wheel is released and the locking mechanism then resets.

What we claim as new and desire to secure by Letters Patent is:

1. The combination with a power drive for valves and the like, of a manual operating mechanism for an element of said drive, comprising a manual operating member rotatable in opposite directions and a gear drive from said member to said element normally in a state to disconnect said member from said element and including means responsive to rotation of said member in either direction to connect said member to said element, but only if said element is then substantially at rest.

2. The combination with a power drive, of a manual operating mechanism for an element of said drive, comprising a manually rotatable operating member and a drive connection from said member to said element normally in a state to disconnect said member from said element, said drive connection including means tending upon rotation of said member to connect said member to said element, and speed responsive means associated with said element preventing said drive connection from connecting said member and said element unless said element is substantially at rest.

3. The combination with a power drive for valves and the like, of a manual operating mechanism for an element of said drive, comprising a manually rotatable operating member and a drive connection from said member to said element normally in a state to disconnect said member from said element and including means tending upon rotation of said member to connect said member to said element, means preventing said drive connection from coupling said member and said element unless said element is substantially at rest and means operating as an incident to coupling of said member and said element to insure against power operation of said power drive.

4. The combination with an electric motor drive for valves and the like, of a manual operating mechanism for an element of said drive, comprising a manually operable member rotatable in opposite directions and a drive connection from said member to said element normally in a state to disconnect said member from said element and including means tending upon rotation of said member in either direction to couple said member to said element, speed responsive means associated with said element preventing said drive connection from coupling said member to said element unless said element is substantially at rest, and means associated with said drive connection for insuring against energization of said motor drive while said member is coupled to said element.

5. The combination with a power drive for valves and the like, of a manual operating mechanism for an element of said drive, comprising a manually rotatable operating member and a drive connection from said member to said element normally in a state to disconnect said member from said element and including means tending upon rotation of said member to connect said member to said element and a manually releasable locking device for said drive connection to lock it in said normal state, said locking means having automatic control means to effect its return to locking position upon power operation of said power drive.

6. The combination with a power drive for valves and the like, of a manual operating mechanism for an element of said drive, comprising a manually rotatable operating member and a drive connection from said member to said element normally in a state to disconnect said member from said element and including means tending upon rotation of said member to couple said member to said element, manually releasable locking means for said drive connection when in said normal state, said locking means having automatic control means to restore it to locking state upon power operation of said power drive, and means associated with said drive connection to prevent power operation of said power drive except when said drive connection is in its normal state.

7. The combination with a power drive for valves and the like, of a manual operating mechanism for an element of said drive comprising a manually rotatable operating member and a drive connection from said member to said element normally in a state to disconnect said member from said element and including means tending upon rotation of said member to couple said member to said element, manually releasable mechanism for locking said drive connection in said normal state, and means for maintaining said locking mechanism in releasing state upon coupling of said member to said element and for restoring said locking mechanism to locking state automatically after return of said drive connection to said normal state and prior to power operation of said power drive.

8. A manual operating mechanism for a valve control having a motor operated valve driving element; comprising a handwheel for operating said driving element and a drive connection operable by rotation of said handwheel in opposite directions to connect said handwheel to said driving element for drive of the latter by the former, said drive connection including means for automatically returning the same to a given normal state to disconnect said handwheel from said driving element when manually applied torque is removed from said handwheel, and a device for then automatically locking said driving connection against operation by said handwheel, said locking device having manual releasing means associated therewith.

9. The combination with a power drive for valves and the like, of a hand wheel for operating an element of said drive and a drive connection operable by rotation of said hand wheel in opposite directions to connect said hand wheel to said element for drive of the latter by the former, said drive connection including means for automatically returning the same to a given normal state to disconnect said hand wheel from said element when manually applied torque is removed from said hand wheel, a manually releasable device for normally locking said drive connection in said given normal state, and means associated with said driving connection for preventing connection of said hand wheel to said element unless said element is substantially at rest.

10. In a valve control having a motor-operated valve actuating mechanism including a valve driving shaft, a gear on said shaft, a hand wheel, a gear driven by said hand wheel and normally uncoupled from said gear on the driving shaft, means operated by rotation of said hand wheel in either direction for effecting coupling of said gears so that said driving shaft may be rotated by said hand wheel, and automatic means for rendering said gears uncoupled from each other when manually applied torque is removed from the hand wheel.

11. In a valve control having a valve-actuating mechanism, a motor for operating the same, automatic means for causing the operation of the valve-actuating mechanism by the motor, a hand-wheel normally uncoupled from said valve-actuating mechanism, means actuated by rotation of the hand-wheel for coupling the hand-wheel to the valve-actuating mechanism for operation of the latter by the hand-wheel but only if the valve-actuating mechanism is then substantially at rest, and means associated with said former means for insuring against energization of the motor upon coupling of the hand-wheel to the valve-actuating mechanism.

12. A manual operating mechanism for a valve control having a valve-operating element and a driving motor permanently coupled thereto, comprising a manual operating member, a driving connection normally in a state to disconnect said member from said valve-operating element and including means responsive to rotation of said member to couple said member to said valve-operating element for direct drive of the latter by the former in opposite directions selectively, and means associated with said driving connection for insuring against energization of said motor upon coupling of said operating member to said valve operating element.

13. A manual operating mechanism for a valve control having a valve operating element and a driving motor permanently coupled thereto, comprising a manual operating member, a driving connection normally in a state to disconnect said member from said valve-operating element and including means responsive to rotation of said member to couple said member to said valve operating element for direct drive of the latter by the former in opposite directions selectively, but only if said valve operating element is then substantially at rest, and means functioning as an incident to coupling of said member to said element for insuring against energization of said motor.

14. A manual operating mechanism for a valve control, having a motor operated valve driving element, comprising a manual operating member, a driving connection from said member to said driving element normally in a state to disconnect said member from said driving element and including means responsive to rotation of said member in either direction to connect said member to said driving element for direct drive of the latter by the former in opposite directions selectively, a mechanism associated with said driving connection including a manual control element having a plurality of operative positions, one for rendering said driving connection ineffective upon rotation of said member and another for rendering said driving connection responsive to connect said member to said element upon rotation of the former.

15. A manual operating mechanism for a valve control, having a motor-operated valve-driving element, comprising a manual operating member, a driving connection from said member to said driving element normally in a state to disconnect said member from said driving element and including means responsive to rotation of said member in either direction to connect said member to said driving element for direct drive of the latter by the former in opposite directions selectively, interlocking means associated with said driving connection including a manual control element having a plurality of operative positions, one for rendering said driving connection ineffective upon rotation of said member and another for rendering said driving connection responsive to connect said member to said element upon rotation of the former, and control means for said motor insuring deenergization thereof upon coupling of said manual member to said valve-driving element.

HOWARD E. HODGSON.
CLARENCE W. KUHN.